US010670471B2

(12) United States Patent
Naidu

(10) Patent No.: US 10,670,471 B2
(45) Date of Patent: Jun. 2, 2020

(54) MULTI-LEVEL TEMPERATURE DETECTION WITH OFFSET-FREE INPUT SAMPLING

(71) Applicant: SanDisk Technologies LLC, Plano, TX (US)

(72) Inventor: Prasad Naidu, Bangalore (IN)

(73) Assignee: SanDisk Technologies LLC, Plano ( * ) Notice: Subject to any disclaimer, the term of this patent is extended or adjusted under 35 U.S.C. 154(b) by 594 days.

(21) Appl. No.: 15/337,547

(22) Filed: Oct. 28, 2016

(65) Prior Publication Data
US 2018/0120166 A1 May 3, 2018

(51) Int. Cl.
G01K 1/02 (2006.01)
(52) U.S. Cl.
CPC .................... G01K 1/026 (2013.01)
(58) Field of Classification Search
CPC .................................................. G01K 1/026
See application file for complete search history.

(56) References Cited

U.S. PATENT DOCUMENTS 3,750,155 A * 7/1973 Oman .................... G01K 1/026
340/870.04
4,055,166 A * 10/1977 Simpson ................. A61B 5/01
600/549
2013/0083616 A1 4/2013 Lee et al.
2014/0321506 A1 * 10/2014 Sato ....................... G01K 1/026
374/170
2015/0360499 A1 12/2015 Huang et al.
2016/0047696 A1 * 2/2016 Ramaraju ................ G01K 7/01
374/170

* cited by examiner

Primary Examiner — Lisa M Caputo
Assistant Examiner — Janice M Soto
(74) Attorney, Agent, or Firm — Dickinson Wright PLLC; Steven Hurles

(57) ABSTRACT

An electronic system may include a controller that measures a plurality of temperatures of the electronic system. Each of the plurality of temperatures may be indicated by one of a plurality of temperature voltages, each of which is generated across the same voltage-generation circuit. The controller and the voltage-generation circuit may be located on a component of the system, such as an integrated circuit, and external temperature sensors may provide their respective temperature signals to an input circuit located on the component. The controller may switch between activating and deactivating a temperature sensor located on the component and the input circuit to generate the plurality of temperature voltages across the voltage-generation circuit at different time intervals.

19 Claims, 8 Drawing Sheets

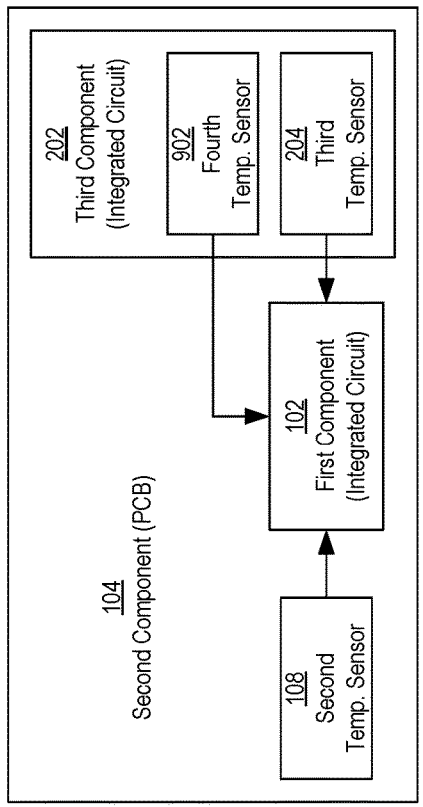
FIG. 9
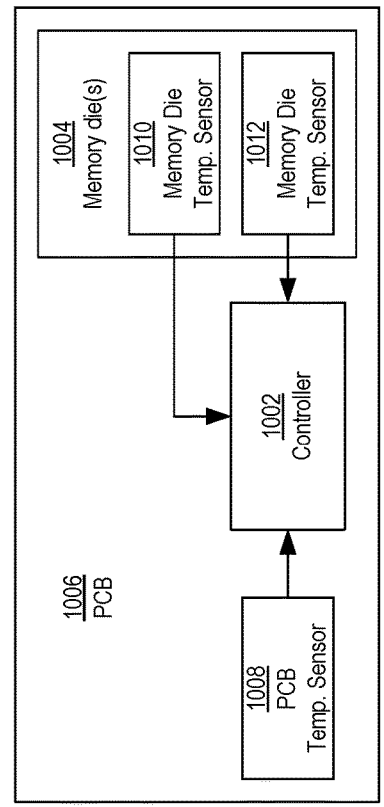
FIG. 10
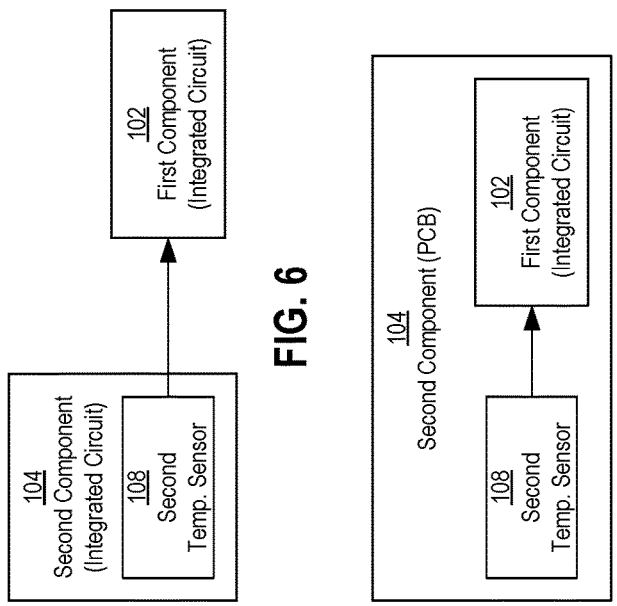
FIG. 6
FIG. 7
FIG. 8

MULTI-LEVEL TEMPERATURE DETECTION WITH OFFSET-FREE INPUT SAMPLING

BACKGROUND

An electronic system may want to monitor temperatures of multiple components of the electronic system. The temperature of each of the components may affect performance of the electronic system, and so monitoring the various temperatures may be desirable. Circuitry involved in measuring a temperature of a component may include a sensor that outputs a signal, such as a current or voltage signal, at a level indicative of the sensed temperature. The circuitry may also include a backend measurement circuit that measures the temperature based on the level of the signal.

In order to measure multiple temperatures, one approach is for each component of the electronic system to include its own backend measurement circuit to measure the temperature. However, such an approach may be costly. Another approach is to have one backend measurement circuit measure the temperatures for all of the components of the system. This approach may be less costly, but would require the sensors on components that do not have backend measurement circuits to send the signals from their respective sensors to the component that does have the backend measurement circuit.

In order to measure the different temperatures, switching may be performed in order to alternatingly sample the different signals received from the different sensors. The switching, however, may offset the levels of the signals, which in turn may result in inaccurate temperature measurement. As such, temperature detection approaches that utilize a single backend measurement circuit while providing for more accurate temperature measurement may be desirable.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIG. 6 is a block diagram of an example configuration of the electronic system of FIG. 1, where the first component and the second component are each integrated circuits.

FIG. 7 is a block diagram of another example configuration of the electronic system of FIG. 1, where the first component is an integrated circuit and the second component is a printed circuit board on which the integrated circuit is disposed.

FIG. 8 is a block diagram of an example configuration of the electronic system of FIG. 2, where the first component is an integrated circuit, the second component is a printed circuit board, and the third component is another integrated circuit.

FIG. 9 is a block diagram of another example electronic system, where one of the components includes multiple temperature sensors.

FIG. 10 is a block diagram of an example memory system implementing the temperature detection circuitry of FIGS. 1-4.

DETAILED DESCRIPTION OF EMBODIMENTS

Overview

Figure 1:
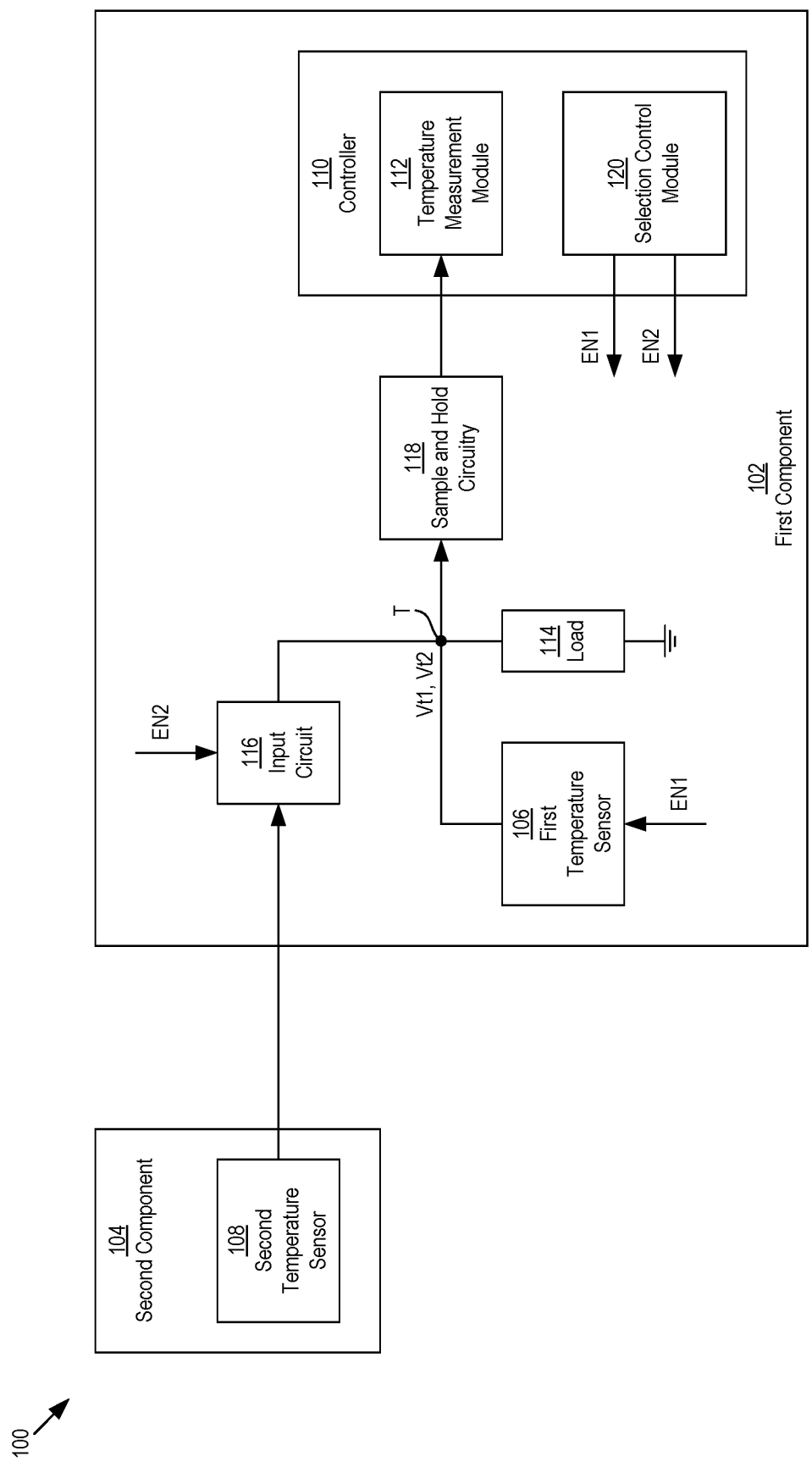
FIG. 1 is a block diagram of an example electronic system that includes temperature detection circuitry for measuring temperatures of components in the system, where the system includes a first component that measures the temperatures, and further includes an external component external to the first component.

The present description describes temperature detection circuitry that includes a controller that measures multiple temperatures of an electronic system. In a first embodiment, temperature detection circuitry includes: a voltage-generation circuit; a first temperature sensing circuit, and an input circuit. The first temperature sensing circuit is configured to be activated and deactivated, and when activated, generate a first voltage across the voltage-generation circuit, where the first voltage is indicative of a first sensed temperature sensed by the first temperature sensing circuit. In addition, the input circuit is configured to generate a second voltage across the voltage-generation circuit when the first temperature sensing circuit is deactivated, where the second voltage is indicative of a second sensed temperature sensed by a second temperature sensing circuit.

In some embodiments, the voltage-generation circuit, the first temperature sensing circuit and the input circuit are configured on a same integrated circuit.

In some embodiments, the first temperature sensing circuit is configured to sense a temperature of the same integrated circuit, and the second sensed temperature sensed by the second temperature sensing circuit is of an area that is off-chip from the same integrated circuit.

In some embodiments, the off-chip area is an area of a printed circuit board.

In some embodiments, an off-chip area is an area of another integrated circuit.

In some embodiments, a sample and hold circuit is configured to receive the first voltage and the second voltage, sample the first voltage to generate a first sampled signal and the second voltage to generate a second sampled signal, and send the first and second sampled signals to a controller for identification of the first and second sensed temperatures.

In some embodiments, the input circuit comprises a buffer amplifier.

In some embodiments, a controller is configured to activate the first temperature sensing circuit and deactivate the input circuit to have the first voltage generated across the voltage-generation circuit during a first time interval, and activate the input circuit and deactivate the first temperature sensing circuit to have the second voltage generated across the voltage-generation circuit during a second time interval.

In some embodiments, the controller is configured to measure the first sensed temperature based on the first voltage generated during the first interval and measure the second sensed temperature based on the second voltage generated during the second time interval.

In some embodiments, a multiplexer configured to receive a first temperature signal from the second temperature sensing circuit and a second temperature signal from a third temperature sensing circuit configured to measure a third sensed temperature; and alternatingly output the first temperature signal and the second temperature signal to the input circuit for alternating generation of the second voltage and a third voltage across the voltage-generation circuit, the third voltage indicative of the third sensed temperature. The controller is further configured to control the multiplexer for output of the first and second temperature signals to the input circuit.

In a second embodiment, an electronic system includes temperature detection circuitry comprising a voltage-generation circuit and a controller. The voltage-generation circuit is configured to generate a plurality of temperature voltages during different time intervals, where each of the temperature voltages is indicative of a different one of a plurality of sensed temperatures of an electronic system. Additionally, the controller is configured to measure each of the plurality of sensed temperatures based on the plurality of temperature voltages generated by the voltage-generation circuit.

In some embodiments, the system includes a component on which the voltage-generation circuit and the controller are located, and where the temperature detection circuitry includes an input circuit configured to receive a temperature signal from an external temperature sensor that is external to the component, the temperature signal indicative of an external temperature sensed by the external temperature sensor.

In some embodiments, an internal temperature sensor is located on the component, and the controller is configured to: during a first time interval of the plurality of time intervals, activate the internal temperature sensor and deactivate the input circuit to generate a first temperature voltage across the voltage-generation circuit, the first temperature voltage indicative of an internal temperature of the component sensed by the internal temperature sensor; and during a second time interval of the plurality of time intervals, activate the input circuit and deactivate the internal temperature sensor to generate a second temperature voltage across the voltage-generation circuit, the second temperature voltage indicative of the external temperature sensed by the external temperature sensor.

In some embodiments, the system includes a printed circuit board, and the component includes an integrated circuit disposed on the integrated circuit, and where the external temperature is a temperature of the printed circuit board.

In some embodiments, the integrated circuit includes a first integrated circuit, the external temperature sensor includes a first external temperature sensor, the external temperature includes a first external temperature, the temperature signal generated by the first external temperature sensor includes a first temperature signal, and the electronic system further includes a second integrated circuit disposed on the printed circuit board, and the input circuit is configured to receive a second temperature signal from a second external temperature sensor that senses a second external temperature of the second integrated circuit.

In a third embodiment, a method of measuring a plurality of temperatures is performed. The method includes: generating a first voltage across a voltage-generation circuit of a first component of an electronic system during a first time interval, the first voltage indicative of a first sensed temperature of the first component; receiving, with an input circuit of the integrated circuit, a temperature signal indicative of a second sensed temperature of a second component of the electronic system; generating a second voltage across the voltage-generation circuit based on the temperature signal during a second time interval; and identifying, with a controller of the first component, each of the first sensed temperature and the second sensed temperature.

In some example embodiments, the method includes: outputting, with a controller of the first component, one or more control signals to activate a sensor of the first component configured to sense the first sensed temperature and deactivate the input circuit during the first time interval; and outputting, with the controller, the one or more control signals to deactivate the sensor of the first component and activate the input circuit during the second time interval.

In some example embodiments, the method includes: activating an amplifier of the sensor to activate the sensor during the first time interval; and deactivating the amplifier of the sensor to deactivate the sensor during the second time interval.

In some example embodiments, the method includes: outputting, with the controller, the one or more control signals to control a multiplexer of the first component to provide a temperature signal to the input circuit during a third time interval, where the temperature signal is indicative of a third sensed temperature.

In some example embodiments, the method includes: sampling, with sample and hold circuitry, the first voltage during the first time interval; and sampling, with the sample and hold circuitry, the second voltage during the second time interval.

In a fourth embodiment, temperature detection circuitry includes: a voltage-generation circuit; means for generating a first voltage across the voltage-generation circuit during a first time interval, the first voltage indicative of a first sensed temperature sensed by a first temperature sensing circuit; and means for generating a second voltage across the voltage-generation circuit during a second time interval, where the second voltage is indicative of a second sensed temperature sensed by a second temperature sensing circuit.

Other embodiments are possible, and each of the embodiments can be used alone or together in combination. Accordingly, various embodiments will now be described with reference to the attached drawings.

Embodiments

As mentioned in the background section, an electronic system may want to monitor temperatures for different components of the electronic system. The following description describes embodiments of an electronic system that includes multiple components, where a controller located on one of the components may measure the temperatures for the multiple components of the system. A voltage-generation circuit that is also located on that same component may generate multiple voltages corresponding to the different temperatures of the different components at different time intervals. Example components may be integrated circuits and printed circuit boards. The embodiments described may provide more accurate temperature measurements, including temperature measurements for off-chip components, compared to other systems that utilize switching components that create an offset in the voltages or currents used to measure the temperatures.

FIG. 1 shows a block diagram of an example electronic system 100 that includes multiple components, including a first component 102 and a second component 104. The first component 102 may include a first temperature sensor 106 (i.e., the first temperature sensor 106 may be located on or configured on the first component 102). The first temperature sensor 106 may be configured to sense a first temperature of the first component 102 or an area of the first component 102. Similarly, the second component 104 may include a second temperature 108 (i.e., the second temperature sensor 108 may be located on or configured on the second component 104). The second temperature sensor 108 may be configured to sense a second temperature of the second component 104 or an area of the second component 104.

The first component 102 may also include a controller or control circuitry 110 that includes a temperature measurement module 112 configured to measure both the first temperature sensed by the first temperature sensor 106 and the second temperature sensed by the second temperature sensor 108. The first component 102 may further include a voltage-generation circuit 114 that is configured to generate a first voltage Vt1 at a level indicative of the first temperature sensed by first temperature sensor 106, and a second voltage Vt2 at a level indicative of the second temperature sensed by the second temperature sensor 108. An example configuration of the voltage-generation circuit 114 may be a resistor or a plurality of resistors connected in series, parallel, or a combination thereof, although other types of voltage-generation circuits configured to generate voltages may be possible.

The first temperature sensor 106 may be configured to generate the first voltage Vt1 across the voltage-generation circuit 114 by supplying a temperature signal, such as a current, indicative of the sensed first temperature. Since the second temperature sensor 108 is located external to the first component 102, the second temperature sensor 108 may not send a temperature signal indicative of the second temperature directly to the voltage-generation circuit 114. Instead, the second temperature signal 108 may send the temperature signal to an input circuit 116 located or configured on the first component 102. In response, the input circuit 116 may be configured to generate the second voltage Vt2 across the voltage-generation circuit 114 based on the temperature signal received from the second temperature sensor 108. An example input circuit may be a buffer amplifier, such as a unity gain buffer amplifier.

For some example configurations, the temperature measurement module 112 may be configured to process digital signals to measure the temperatures, as opposed to analog signals, such as an analog voltage generated across the voltage-generation circuit 114. For these configurations, as shown in FIG. 1, the first component 102 may include sample and hold circuitry 118 configured in between the voltage-generation circuit 114 and the temperature measurement module 112 of the controller 110. The sample and hold circuitry 118, which may be and/or may include an analog circuit, may be configured to receive the first and second voltages Vt1, Vt2 sample and generate sampled signals of each of the first and second voltages Vt1, Vt2, and send the sampled signals to the temperature measurement module 112 for measurement. The sample and hold circuitry 118 is shown in FIG. 1 as being a component separate from the controller 110, although in other example configurations, the sample and hold circuitry 118 may be part of the controller 110.

The temperature measurement module 112 may include an analog-to-digital converter (ADC) that converts the sampled analog signals generated by the sample and hold circuitry 119 to equivalent digital signals. So that the temperature measurement module 112 can measure both the first temperature and the second temperature, the first and second voltages Vt1, Vt2 may be alternatingly generated across the voltage-generation circuit 114 at different times or during different time intervals. For example, the first voltage Vt1 may be generated across the voltage-generation circuit 114 during a first time interval and the second voltage Vt2 may be generated across the voltage-generation circuit 114 during a second time interval.

In order to alternatingly generate the first and second voltage Vt1, Vt2 across the voltage-generation circuit 114, the first temperature sensor 106 and the input circuit 116 may be configured to be alternatingly activated and deactivated. When the first temperature sensor 106 is activated, the first temperature sensor 106 may be configured to supply its temperature signal to the voltage-generation circuit 114 for generation of the first voltage Vt1 indicative of the first sensed temperature. During the time that the first temperature sensor 106 is activated, the input circuit 116 may be deactivated so that its output may be floating relative to the node T where the first and second voltages Vt1, Vt2 are generated. In this way, the input circuit 116 may not influence the level of the first voltage Vt1 generated across the voltage-generation circuit 114 while the first temperature sensor 106 is activated. On the other hand, when the input circuit 116 is activated, the input circuit 116 may be configured to its temperature signal to the voltage-generation circuit 114 for generation of the second voltage Vt2 indicative of the second sensed temperature. During the time that the input circuit 116 is activated, the first temperature sensor 106 may be deactivated so that its output may be floating relative to the node T. In this way, the first temperature sensor may not influence the level of the second voltage Vt2 generated across the voltage-generation circuit 114 while the input circuit 116 is activated.

During the first time interval, the sample and hold circuitry 118 may be configured to sample the first voltage Vt1, hold the sampled voltage at a level corresponding to the level of the first voltage Vt1 when it was sampled, and provide the sampled voltage to the temperature measurement module 112 for measurement of the first sensed temperature. Similarly, during the second time interval, the sample and hold circuitry 118 may be configured to sample the second voltage Vt2, hold the sample at a level corresponding to the level of the second voltage Vt2, and provide the sampled voltage to the temperature measurement module 112 for measurement of the second sensed temperature.

Activation and deactivation of the first temperature sensor 106 and the input circuit 116, and in turn generation of the first and second voltages Vt1, Vt2, may be controlled by a selection control module 120. The selection control module 120 may be configured to generate and output a first activation or enable signal EN1 to the first temperature sensor 106 to activate and deactivate the first temperature sensor 106. Similarly, the selection control module 120 may be configured to generate and output a second activation or enable signal EN2 to the input circuit 116 to activate and deactivate the input circuit 116.

The selection control module 120 may be configured to determine the first and second intervals and/or generate the first and second activation signals EN1, EN2 according to the first and second intervals. That is, during the first time interval when the first voltage Vt1 is to be generated across the voltage-generation circuit 114, the selection control module 120 may output the first and second activation signals EN1, EN2 so that the first temperature sensor 106 is activated and the input circuit 116 is deactivated. In addition, during the second time interval when the second voltage Vt2 is to be generated across the voltage-generation circuit 114, the selection and control module 120 may output the first and second activation signals EN1, EN2 so that the first temperature sensor 106 is deactivated and the input circuit 116 is activated.

In general, the term "module" as used herein for the temperature measurement module 112 and the selection control module 120, may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, the temperature measurement module 104 may include memory hardware that comprises instructions executable with a processor or processor circuitry to implement one or more of the features of the temperature measurement module 104. When the temperature measurement module 104 includes the portion of the memory that comprises instructions executable with the processor, the temperature measurement module 104 may or may not include the processor. In some examples, the temperature measurement module 104 may just be the portion of the memory that comprises instructions executable with the processor to implement the features of the corresponding module without the temperature measurement module 104 including any other hardware. Because the temperature measurement module 104 includes at least some hardware even when the included hardware comprises software, the temperature measurement module 104 may be interchangeably referred to as a hardware module.

Figure 2:
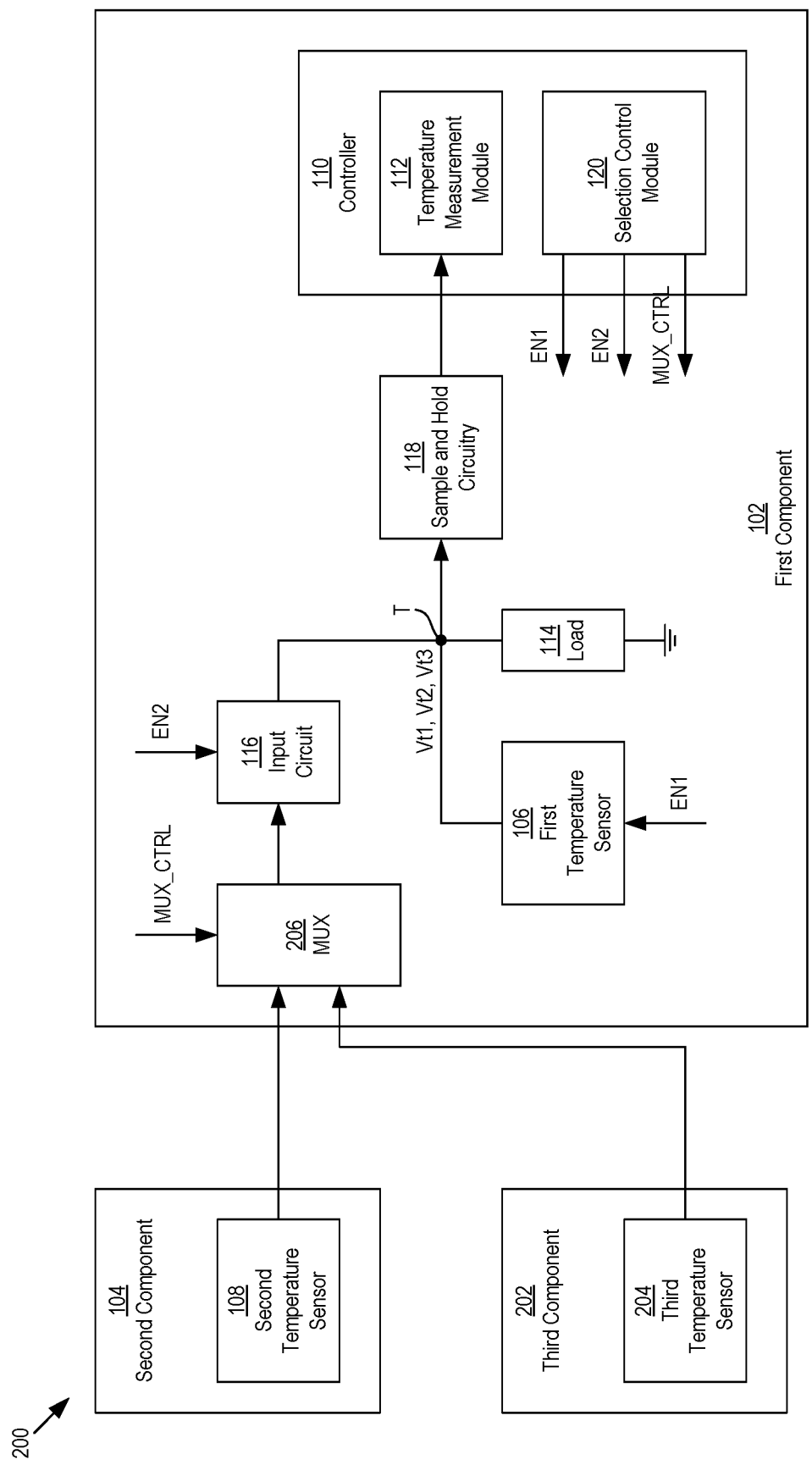
FIG. 2 is a block diagram of another example electronic system that includes temperature detection circuitry for measuring temperatures of components of the system, where the system includes a first component that measures the temperatures, and further includes multiple external components and multiple external sensors to sense temperatures of the multiple external components.

FIG. 2 shows another example electronic system 200 that includes multiple components in which one of the components measures the different temperatures for the multiple components. The example system 200 shown in FIG. 2 may be similar to the example system 100 of FIG. 1, except that the example system 200 includes multiple temperature sensors that are external to the first component 102. In particular, the example system 200 includes the second temperature sensor 108 configured to measure the second temperature of the second component 104 and a third temperature sensor 204 configured to measure a third temperature of a third component 202 of the system 200. Each of the second temperature sensor 108 and the third temperature sensor 204 may be configured to send their respective temperature signals to the first component 102 for measurement of the second and third temperatures.

During operation for temperature measurement, three voltages Vt1, Vt2, Vt3 may be generated across the voltage-generation circuit during different time intervals, including a first time interval for generation of the first voltage Vt1, a second time interval for generation of the second voltage Vt2, and a third time interval for generation of the third voltage Vt3. So that the input circuit 116 supplies different temperature signals to generate the second and third voltages Vt2, Vt3 during the different (i.e., second and third) time intervals, the first component 102 may further include a multiplexer (MUX) 206 configured or positioned at the input of the input circuit 116. The second temperature sensor 108 and the third temperature sensor 204 may each provide their temperature signals to the multiplexer 206, and the multiplexer may provide one of the temperatures to the input circuit 116.

Which temperature signal the multiplexer 206 provides to the input circuit 116 at a given point in time may be determined by a multiplexer control signal MUX_CTRL, which may be generated and output by the selection control module 120, as shown in FIG. 2. Accordingly, during both the second and third time intervals, the selection control module 120 may output the first activation signal EN1 to deactivate the first temperature sensor 106 and output the second activation signal EN2 to activate the input circuit 116. In addition, during the second time interval, the selection control module 120 may output the multiplexer control signal MUX_CTRL so that the multiplexer 206 outputs the temperature control signal corresponding to the second temperature sensor 108 and the second voltage Vt2 is generated across the voltage-generation circuit 114. Similarly, during the third time interval, the selection control module 120 may output the multiplexer control signal MUX_CTRL so that the multiplexer 206 outputs the temperature control signal corresponding to the third temperature sensor 204 and the third voltage Vt3 is generated across the voltage-generation circuit 114.

The input circuit 116 may provide a relatively high input impedance. As a result, voltage drops resulting from current flow during operation of the multiplexer 206—which may offset or otherwise change the level of the temperature signals, leading to inaccurate voltage levels for the second and third voltages Vt2, Vt3 and in turn inaccurate measurements of the second and third temperatures—may be avoided.

Figure 3:
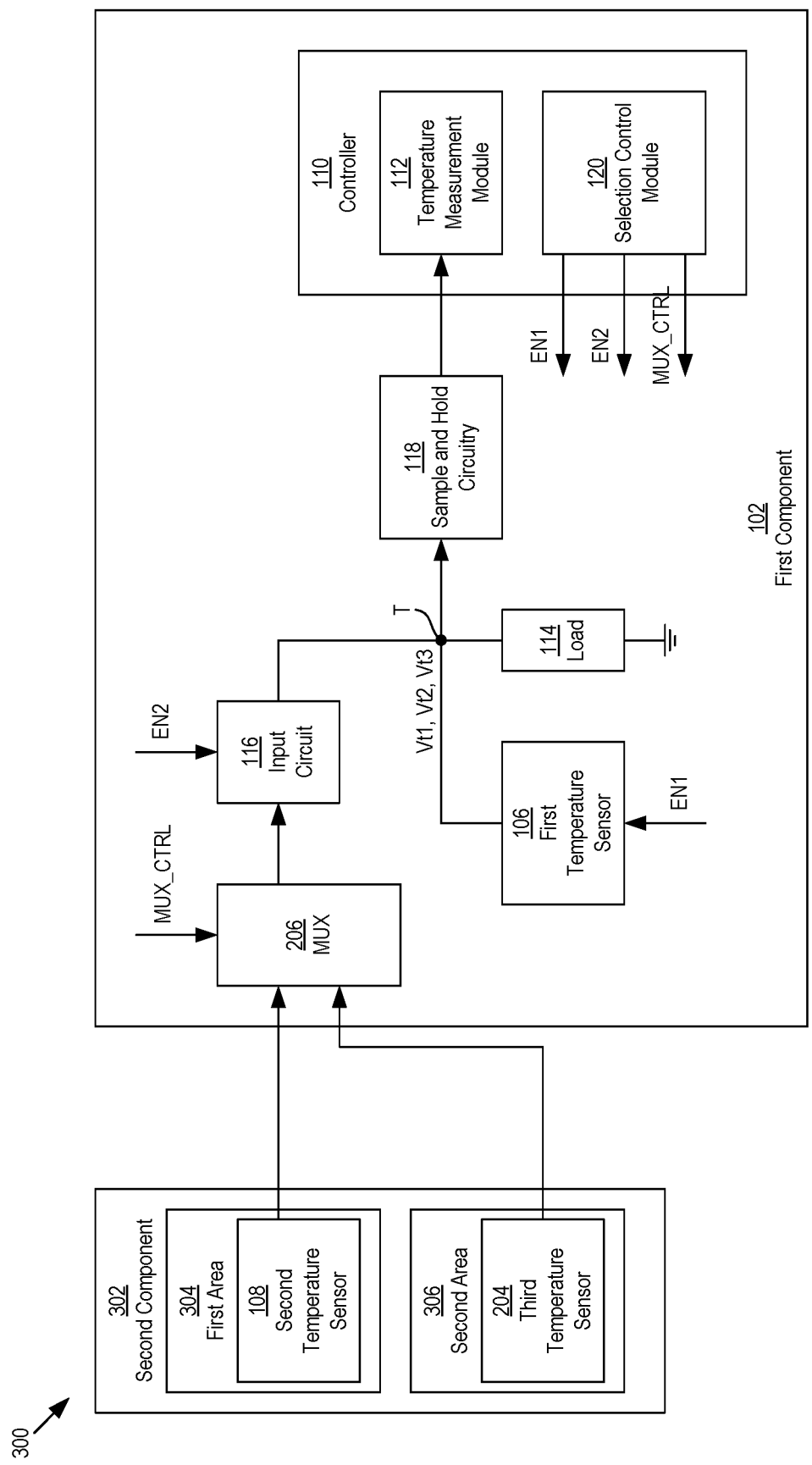
FIG. 3 is a block diagram of another example electronic system that includes temperature detection circuitry for measuring temperatures of components of the system, where the system includes a first component that measures the temperatures, and further includes an external component with multiple sensors that sense temperatures of different areas of the external component.

FIG. 2 shows the third temperature sensor 204 located or configured on a third component 202 that is different or separate from the second component 104 on which the second temperature sensor 108 is located or configured. FIG. 3 shows another example system 300, which is similar to the example system 200 of FIG. 2, except that instead of being located on different components 104, 202, the second and third sensors 108, 204 are located on the same (second) component 302, but configured to sense temperatures of different areas 304, 306 of the same component 302.

Figure 4:
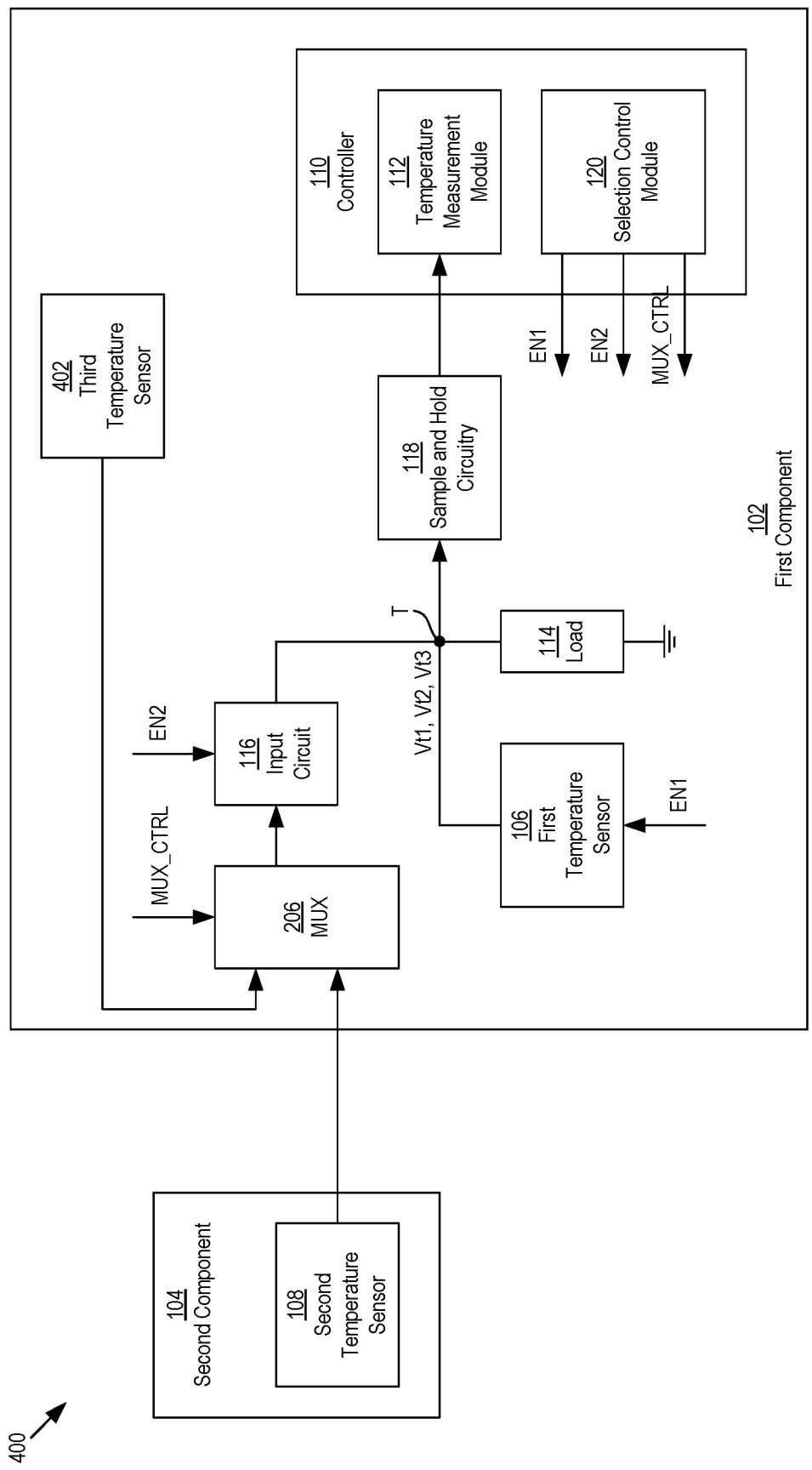
FIG. 4 is a block diagram of another example electronic system that includes temperature detection circuitry for measuring temperatures of components of the system, where the system includes a first component that measures the temperatures, and further includes an external component with an external sensor that senses a temperature of the external component, and where the first component includes an additional sensor to sense an additional temperature of the first component.

FIG. 4 shows another example system 400, which is similar to the example systems 200, 300 of FIGS. 2 and 3, except that instead of including a third temperature sensor that is external to the first component 102, a third temperature sensor 402 is located on and/or internal to the first component 102. The third temperature sensor 402 may be configured to sense an additional temperature of the first component 102. For example, the first temperature sensor 106 may be configured to sense a first temperature of the first component 102 and the third temperature sensor 402 may be configured to sense a second temperature of the first component 102. The first and second temperatures may be of different areas of the first component 102. As shown in FIG. 4, the third temperature sensor 402 may send its temperature signal to the multiplexer 206. The selection control module 120 may output the multiplexer control signal MUX_CTRL to set whether the multiplexer 206 outputs the temperature control signal corresponding to the second third temperature sensor 108 located external the first component or the temperature control signal corresponding to the third temperature sensor 402 located internal to the first component 102.

Figure 5:
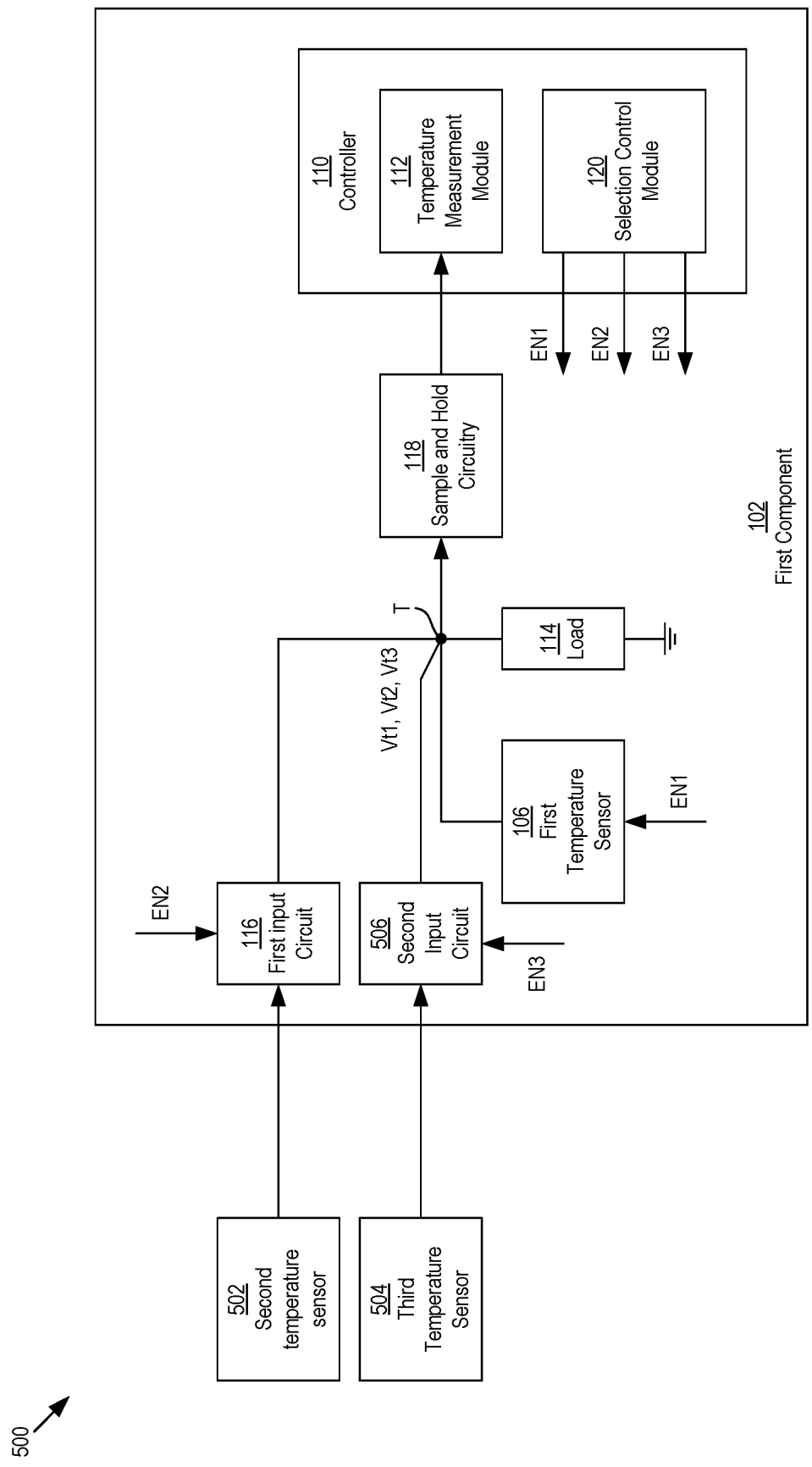
FIG. 5 is a block diagram of another example electronic system that uses multiple input circuits instead of a multiplexer to receive temperature signals from multiple external sensors.

FIG. 5 shows another example system 500 that includes multiple components in which one of the components measures the different temperatures for the multiple components. Like the example systems 200, 300 and 400, the example system 500 includes second and third temperature sensors 502, 504, other than the first temperature sensor 106, that each do not have their respective outputs directly connected to the voltage-generation circuit 114 like the first temperature sensor 106. Each of the second and third temperature sensors 502, 504 may be an external temperature sensor located external to the first component 102 or an internal temperature sensor located internal to the first component. For the example system 500, instead of utilizing a multiplexer in front of the input circuit 116, the example system 400 may utilize multiple input circuits, including the input circuit 116 and a second input circuit 506 (e.g., a second buffer amplifier). Each of the input circuits 116, 506 may have its output connected to the node T for generation of a respective voltage Vt2, Vt3 indicative of a corresponding one of the sensed temperatures sensed by the second and third temperature sensors 502, 504. In addition, each of the temperature signals generated by the second and third temperature sensors 502, 504 may be supplied to a respective input circuit 116, 506 located on the first component 102. When the selection control module 120 wants a voltage corresponding to a particular one of the temperature signals to be generated, it may generate and output activation signals EN to the plurality of input circuits so that the input circuit receiving that particular temperature signal is activated and the other input circuits are deactivated. For example, when the selection control module 120 wants the second voltage Vt2 to be generated across the voltage-generation circuit 114, it may send the second activation signal EN2 to activate the first input circuit 116 and send a third activation signal EN3 to deactivate the second input circuit 506. Similarly, when the selection control module 120 wants the third voltage Vt3 to be generated across the voltage-generation circuit 114, it may send the second activation signal EN2 to deactivate the first input circuit 116 and send the third activation signal EN3 to activate the third input circuit 506. Other configurations that combine one or more multiplexer and one or more input circuits may be possible.

Each of the example systems 200, 300, 400, 500 of FIGS. 2-5 show two additional temperature external sensors, in addition to the first temperature sensor 106, where at least one of the additional temperature sensors is located external to the first component and that sends its temperature signal to the first component 102 for measurement. Other example systems may include more than two additional temperature sensors, which may include multiple temperature sensors located external to the first component 102, multiple temperature sensors located internal to the first component 102, or combinations thereof. The additional temperature sensors may be configured to measure temperatures of two or more components, two or more areas of a same component, or various combinations thereof. Each of the additional temperature sensors may send their respective temperature signal to a multiplexer located on the component measuring the temperatures (such as the configurations shown in FIGS. 2, 3 and 4), or to a corresponding input circuit (such as the configuration shown in FIG. 5).

The temperature detection circuitry of the example systems 100, 200, 300, 400, 500 of FIGS. 1-5 may provide more accurate temperature measurement compared to other temperature detection configurations that offset one or more levels of the voltages. Such other temperature detection configurations may position selection or switching circuitry in between the voltage-generation circuit 114 and the sample and hold circuitry 118. A voltage used to measure the second temperature sensed by the second temperature sensor 108 of the second component 104 may not be generated across the voltage-generation circuit 114, but instead with the selection circuitry. As such, the only voltage generated across the voltage-generation circuit 114 is the first voltage Vt1 generated using the first temperature sensor 106. When the sample and hold circuitry 118 is to sample a voltage corresponding to the second temperature and/or the third temperature, the selection circuitry may be configured so that the voltage-generation circuit 114 is disconnected from the sample and hold circuitry 118, and the input circuit 116 is connected to the sample and hold circuitry 118. However, the selection circuitry may inherently provide a voltage drop when generating the voltage to be sampled by the sample and hold circuitry 118, which in turn may lead to inaccurate temperature measurement performed by the temperature measurement module 112. In contrast, for the configurations shown in FIGS. 1-5, all of the voltages Vt1, Vt2, Vt3 for all of the components 102, 104, 202 are generated across the same voltage-generation circuit 114 and selection circuitry in between the voltage-generation circuit 114 and the sample and hold circuitry 118 is not included. As a result, any undesired offset voltage generated by the selection circuitry may be eliminated, leading to more accurate temperature measurements performed by the temperature measurement module 112.

The components on which the sensors are located and/or configured, such as the first component 102, the second component 104, and the third component 202, may each be an integrated circuit (IC) or a printed circuit board (PCB). For configurations where the first component 102 is an integrated circuit, the components located on the first integrated circuit 102, such as the first temperature sensor 106, the controller 110, the voltage-generation circuit 114, the input circuit 116, the sample and hold circuitry 118, the multiplexer 206, the third temperature sensor 402 (FIG. 4) and the second input circuit 506 (FIG. 5), may be "on-chip" components of the first integrated circuit 102 and part of the same fabrication process to make the first integrated circuit 102. Accordingly, the external components of the systems that are external to the first integrated circuit 102, such as the second component 104, the second temperature sensor 108, the third component 202, and the third temperature sensor 204 (FIGS. 2 and 3), may be "off-chip" components of the first integrated circuit 102 and part of one or more different fabrication processes than the fabrication process performed to manufacture the first integrated circuit 102.

For some example embodiments, within an electronic system or device, the various components 102, 104, 202, 302 be, at least part of, a die or integrated circuit, a package, or a printed circuit board (PCB). These different components may be considered to be part of different levels (e.g., different implementation levels) of the system or device in which they are implemented. In this regard, the temperature detection circuitry implemented on the first component 102 may be referred to as being configured for multi-level temperature detection since it is configured to detect and/or measure the temperature at different levels of the system or device.

FIGS. 6-10 show block diagrams of example implementations for the various components and temperature sensors shown in FIGS. 1-5. In some example configurations, the first component 102 and the second component 104 may each be integrated circuits, where the second temperature sensor 108 located on the second integrated circuit 104 sends its temperature signal to the first integrated circuit 102 for measurement, as shown in FIG. 6. Referring to FIG. 7, in other example configurations, the first component 102 is an integrated circuit, and the second component 104 is a printed circuit board 104 on which the integrated circuit 102 is disposed. The second temperature sensor 108 located on the printed circuit board 104 is configured to sense a temperature of the printed circuit board 104 and sends its temperature signal to the integrated circuit 102 for measurement.

Referring to FIG. 8, in other example configurations, the second component 104 is a printed circuit board, the first component 102 is a first integrated circuit disposed on the printed circuit board 104, and the third component 202 is an additional (second) integrated circuit also disposed on the printed circuit board 104. The second temperature sensor 108 located on the printed circuit board 104 and the third temperature sensor 204 located on the second integrated circuit 202 each send their respective temperature signals to the first integrated circuit 102 for measurement.

The example configuration shown in FIG. 9 is similar to the configuration shown in FIG. 8, except that the additional integrated circuit 202 includes two temperature sensors, the third temperature sensor 204 and a fourth temperature sensor 802, to sense temperature of different areas of the second integrated circuit 202. Each of the second temperature 108, the third temperature sensor 204, and the fourth temperature sensor 902 each send their respective temperature signals to the first integrated circuit 102.

Various other types of configurations or combinations of configurations utilizing printed circuit boards and integrated circuits, each having one or more temperature sensors, may be possible. One other non-limiting example may be where the printed circuit board 104 includes multiple temperature sensors that sense temperature for different areas of the printed circuit board.

FIG. 10 shows an example memory system 1000 that may use the temperature detection circuitry as described with reference to FIGS. 1-9. The memory system 1000 may include a controller 1002 and one or more memory dies 1004. The controller 1002 may be configured to perform various memory functions of the memory system 1000. The memory die(s) 1004 may include memory cells or elements, such as non-volatile memory cells, configured to store data. Other circuitry, such as digital logic and latches, may also be configured on the memory die(s) 1004. The controller 1002 and the memory die(s) 1004 may be separated integrated circuits that are part of their own fabrication processes. In addition, the controller 1002 and the memory die(s) 1004 may each be disposed on a printed circuit board 1006. To optimize performance and/or monitor the health of the memory system 1000, it may be desirable for the controller 1002 to monitor the temperature of the memory die(s) 1004 and the also the temperature of the printed circuit board 1006. Accordingly, a PCB temperature sensor 1008 may be configured on the PCB 1006 to sense the temperature of the PCB 1006. Additionally, one or more memory die temperature sensors, such as memory die temperature sensor 1010 and memory die temperature sensor 1012, may be located on one or more of the memory dies 1004. In order to monitor and measure the temperatures of the various components of the memory system 1000, the controller 1002 may include temperature detection circuitry, such as that integrated on the first component 102 as shown and described with reference to FIGS. 1-5.

Figure 11:
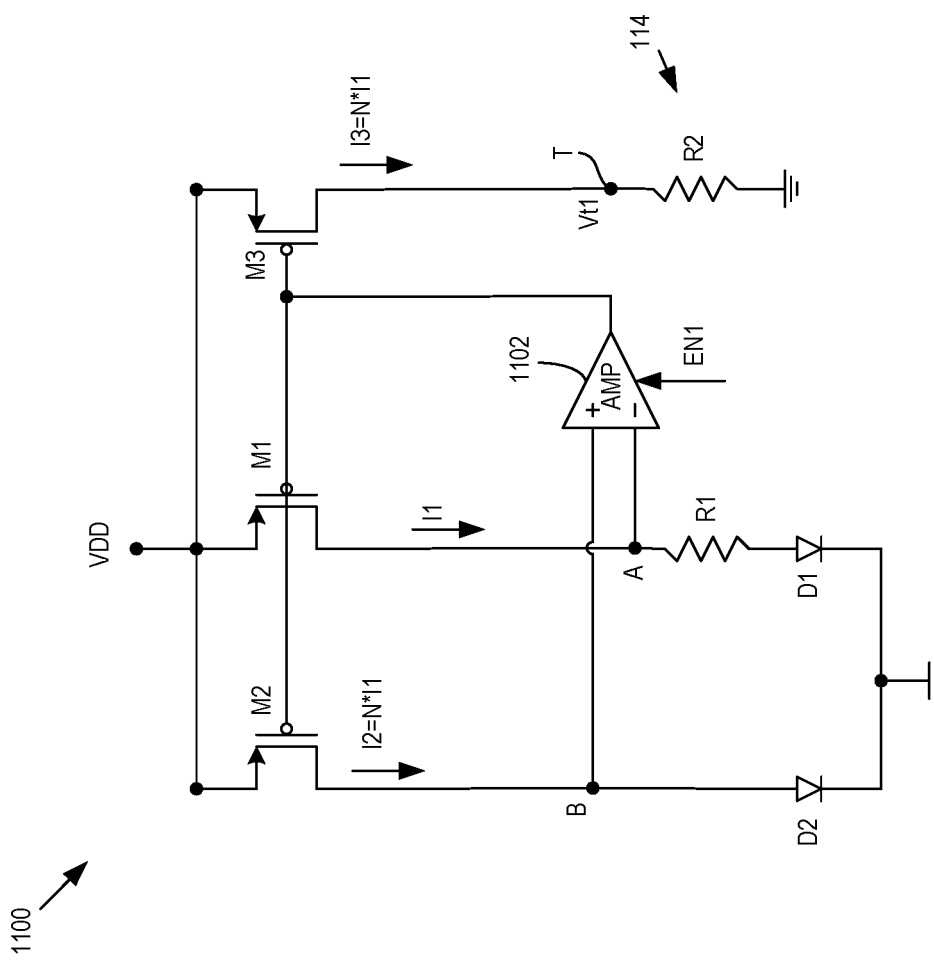
FIG. 11 is a circuit schematic of an example circuit of the first component of FIGS. 1-4 that is configured to sense a temperature of the first component.

The first temperature sensor 106 located on the first component 102, as shown and described with reference to FIGS. 1-5, may be a sensor that utilizes an amplifier to output a signal indicative of a sensed temperature. FIG. 11 shows a circuit schematic of an example temperature sensing circuit 1100 that is configured to sense a temperature of the first component 102. The circuit 1100 may include an amplifier (AMP) 1102; current mirror circuitry that includes a first p-channel metal-oxide-semiconductor field effect transistor (PMOS transistor) M1, a second PMOS transistor M2, and a third PMOS transistor M3; and a pair of diodes D1 and D2. As shown in FIG. 11, an output of the amplifier 1102 is connected to the gate terminals of each of the PMOS transistors M1, M2, and M3. Additionally, a voltage source VDD is connected to the source terminals of each of the PMOS transistors M1, M2, and M3.

The first PMOS transistor M1, a first resistor R1, and a first diode D1 may form a first arm of the circuit 1100. As shown in FIG. 11, a drain of the first PMOS transistor M1 is connected to one end of the first resistor R1 and an anode end of the first diode D1 is connected to the other end of the first resistor R1. A first current I1 may flow through the first arm, i.e. flow through the first PMOS transistor M1, through the first resistor R1, and through the first diode D1.

Additionally, the second PMOS transistor M2 and the second diode D2 may form a second arm of the circuit 1100. A second current I2, which may be proportional to the first current by a fixed factor N dependent on a tradeoff between area and power, may flow through the second arm, i.e., flow through the second PMOS transistor M2, and through the second diode D2. The cathode ends of each of the first and second diodes D1, D1 may be connected to ground.

Also, the third PMOS transistor M3 may supply a third current I3, which may also be proportional to the first current by the factor N, to the voltage-generation circuit 114, which may be configured as a second resistor R2 as shown in FIG. 11. The third current I3 may be temperature signal supplied by the first temperature sensor 106 to generate the first voltage Vt1.

The second current I2 that flows to second diode D2 may provide a voltage drop across the second diode D2, which may be generated at a node B as shown in FIG. 11. Similarly, the first current I1 that flows through the first resistor R1 to the first diode D1 may provide a voltage drop across the first diode D1, which may be generated at a node A. The voltage generated at node B may be provided to a first, positive input of the amplifier 1102, and the voltage generated at node A may be provided to a second, negative input of the amplifier 1102. In turn, the amplifier 1102 may generate and output a voltage at a level corresponding to an amplified difference of the voltage generated at node B and the voltage generated at node A. A gain of the amplifier 1102 may be equal to a resistance of the second resistor R2 divided by a resistance of the first resistor R1. The output voltage of the amplifier 1102 may be applied to the gates of each of the PMOS transistors M1, M2, M3, which may determine the amounts of each of the first, second, and third currents I1, I2, and I3. Since the amount of the third current I3 determines the level of the first voltage Vt1 across the voltage-generation circuit 114, then ultimately, the level of the first voltage Vt1 is indicative of the difference in voltage levels between the voltage generated at node B and the voltage generated at node A.

In some example configurations, the diodes D1 and D2 may be configured as p-n junction diodes, or alternatively, may be bipolar junction transistors with their base terminals connected to their respective collector terminals so that they function as diodes. In addition, in some example configurations, the number of diode circuits comprising the diode D2 may be an integer K times the number of diode circuits comprising the diode D1. K may be 8 for example. The difference in numbers of the diode circuits for diodes D1 and D2 may be used to generate the difference in voltage levels between the voltage generated at node B and the voltage generated at node A, and/or may be used for matching purposes. The forward voltages of the diodes D1 and D2 may be temperature dependent. By keeping the amount of current among the first, second, and third currents I1, I2, and I3 proportional by a constant factor N, changes in the difference between the voltages generated at node B and at node A correspond to changes in temperature. As such, a particular level of the first voltage Vt1 generated across the second resistor R2 may be indicative of a particular temperature sensed by the circuit 1000, and changes in the level of the first voltage Vt1 may be indicative of corresponding temperature changes.

In addition, as shown in FIG. 11, the amplifier 1102 may be configured to receive the first activation signal EN1, such as from the selection control module 120 (FIG. 1). When the first activation signal EN 1 deactivates the amplifier 1102, the amplifier 1102 may generate a floating output, which in turn causes the drain of the third PMOS transistor M3 to be floating relative to the node T.

Figure 12:
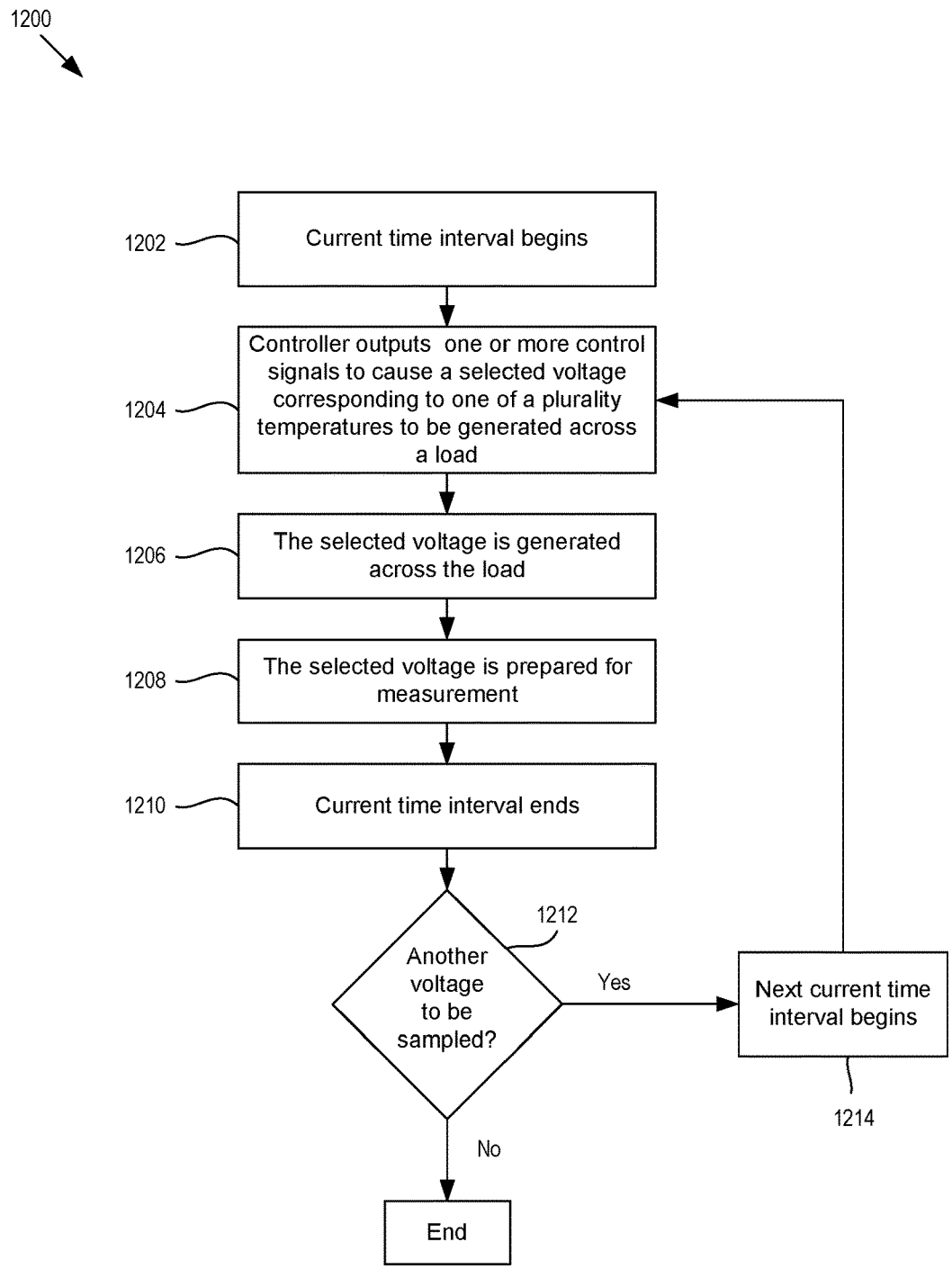
FIG. 12 is a flow chart of an example method of measuring a plurality of temperatures of an electronic system.

FIG. 12 shows a flow chart of an example method 1200 of measuring a plurality of temperatures of an electronic system. The electronic system may include a plurality of temperature sensors that sense the plurality of temperatures. A controller of the system configured to measure the plurality of temperatures may be located on one of the components of the electronic system. At least one of the temperatures is an internal temperature sensor that is located on the same component as the controller, and at least one of the other temperature sensors is an external temperature sensor that is located external to the component. A voltage-generation circuit located on the component may be configured to generate a plurality of voltages, each during a different one of a plurality of time intervals. Each of the voltages may be indicative of one of the plurality of temperatures sensed by one of the plurality of temperature sensors. In addition, each of the voltages may be generated based on a temperature signal output by a respective one of the plurality of temperature sensors. The electronic system may be, may be similar to, and/or may include the components of the electronic systems described with reference to FIGS. 1-10.

At block 1202, a current time interval begins. At block 1204, during the current time interval, the controller may output one or more control signals to cause a selected one of the plurality of voltages to be generated across a voltage-generation circuit of the component. The controller may determine or select which voltage of the plurality of voltages is to be sampled during the current time interval, and in response, output the one or more control signals to cause that voltage to be generated across the voltage-generation circuit. In some methods, the controller may output the one or more controls signals to activate some circuitry while deactivating other circuitry of the first component in order to have the selected voltage generated across the voltage-generation circuit. For example, the controller may determine that during the current time interval, a voltage corresponding to a temperature sensed by an internal temperature sensor is to be generated. In response, the controller may output the one or more control signals to activate the internal temperature sensor of the first component and deactivate an input circuit configured to receive a temperature signal from an external sensor. Alternatively, the controller may determine that during the current time interval, a voltage corresponding to a temperature sensed by an external temperature sensor is to be generated and sampled. In response, the controller may output the one or more control signals to activate the input circuit and deactivate the internal temperature sensor. For some example methods, if the system includes multiple external sensors, then the controller may output the one or more control signals to also cause a multiplexer of the component to output one of a plurality of temperature signals it is receiving from the external sensors to the input circuit in order to have the desired voltage generated across the voltage-generation circuit. In addition or alternatively, for circuit configurations that utilize multiple input circuits to receive multiple temperature signals, the controller may output the one or more control signals to deactivate one or more input circuits receiving temperature signals corresponding to voltages that the controller does not want generated during the current time interval.

At block 1206, in response to the output of the one or more control signals, the selected voltage may be generated across the voltage-generation circuit during the current time interval. At block 1208, the selected voltage may be prepared for measurement. For some example methods, preparing the selected voltage for measurement may include a sample and hold circuit of the component sampling the selected voltage at a level indicative of the temperature corresponding to the selected voltage. In addition, for some example methods, preparing the selected voltage for measurement may further include converting the sampled voltage to a digital signal. Also, for some example methods, the controller may measure or identify the temperature corresponding to the sampled voltage and/or the digital equivalent of the sampled voltage. The controller may perform the measurement during the current time interval, or at a later time after the current time interval has expired.

At block 1210, the current time interval may end and at block 1212, the controller may determine whether another or next selected one of the plurality of voltages is to be generated across the voltage-generation circuit in order to measure another temperature of the system. If not, then the method may end. Alternatively, if so, then a next current time interval may begin at block 1214 and the method may proceed back to block 1204, where the controller generates and outputs one or more control signals to cause the next selected one of the plurality of voltages to be generated across the voltage-generation circuit.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

I claim:

1. Temperature detection circuitry comprising:
 a voltage-generation circuit disposed on an integrated circuit;
 a first temperature sensing circuit disposed on the integrated circuit and electrically connected to the voltage-generation circuit without a switching element therebetween, wherein the first temperature sensing circuit is configured to be activated and deactivated, and when activated, generate a first voltage across the voltage-generation circuit, the first voltage indicative of a first sensed temperature sensed by the first temperature sensing circuit; and
 an input circuit disposed on the integrated circuit and electrically connected to the voltage-generation circuit without a switching element therebetween, wherein the input circuit is configured to generate a second voltage across the voltage-generation circuit when the first temperature sensing circuit is deactivated, the second voltage indicative of a second sensed temperature sensed by a second temperature sensing circuit disposed off-chip with respect to the integrated circuit;
 wherein the input circuit comprises a buffer amplifier.

2. The temperature detection circuitry of claim 1, wherein the first temperature sensing circuit is configured to sense a temperature of the same-integrated circuit, and wherein the second sensed temperature sensed by the second temperature sensing circuit is configured to sense a temperature off-chip with respect to the integrated circuit.

3. The temperature detection circuitry of claim 2, wherein the off-chip area is an area of a printed circuit board.

4. The temperature detection circuitry of claim 2, wherein the off-chip area is an area of another integrated circuit.

5. The temperature detection circuitry of claim 1, further comprising a sample and hold circuit configured to receive the first voltage and the second voltage, sample the first voltage to generate a first sampled signal and the second voltage to generate a second sampled signal, and send the first and second sampled signals to a controller for identification of the first and second sensed temperatures.

6. The temperature detection circuitry of claim 1, further comprising a controller that is configured to activate the first temperature sensing circuit and deactivate the input circuit to have the first voltage generated across the voltage-generation circuit during a first time interval, and activate the input circuit and deactivate the first temperature sensing circuit to have the second voltage generated across the voltage-generation circuit during a second time interval.

7. The temperature detection circuitry of claim 6, wherein the controller is further configured to measure the first sensed temperature based on the first voltage generated during the first interval and measure the second sensed temperature based on the second voltage generated during the second time interval.

8. The temperature detection circuitry of claim 6, further comprising a multiplexer configured to:
 receive a first temperature signal from the second temperature sensing circuit and a second temperature signal from a third temperature sensing circuit configured to measure a third sensed temperature; and
 alternatingly output the first temperature signal and the second temperature signal to the input circuit for alternating generation of the second voltage and a third voltage across the voltage-generation circuit, the third voltage indicative of the third sensed temperature,
 wherein the controller is further configured to control the multiplexer for output of the first and second temperature signals to the input circuit.

9. An electronic system comprising:
 temperature detection circuitry disposed on an integrated circuit, the temperature detection circuitry comprising:
  a voltage-generation circuit configured to generate a first temperature voltage during a first time interval;
  an input circuit configured to generate a second temperature voltage during a second time interval, different from the first time interval, and
  a controller configured to measure each of a plurality of sensed temperatures based on the first temperature voltage and the second temperature voltage;
  wherein the first temperature voltage is indicative of a first temperature sensed by a first temperature sensor and the second temperature voltage is indicative of a second temperature sensed by a second temperature sensor disposed off-chip with respect to the integrated circuit;
  wherein the voltage-generation circuit is electrically connected to each of the first temperature sensor and the second temperature sensor without a switching-element therebetween; and
  wherein the input circuit comprises a buffer amplifier.

10. The electronic system of claim 9, wherein the input circuit is further configured to receive a temperature signal from the second temperature sensor, the temperature signal indicative of an external temperature sensed by the external temperature sensor.

11. The electronic system of claim 10, wherein the controller is further configured to:
 during the first time interval, activate the first temperature sensor and deactivate the input circuit to generate the first temperature voltage across the voltage-generation circuit, the first temperature voltage indicative of an internal temperature of the integrated circuit; and
 during the second time interval, activate the input circuit and deactivate the first temperature sensor to generate the second temperature voltage across the voltage-generation circuit, the second temperature voltage indicative of an external temperature sensed by the second temperature sensor.

12. The electronic system of claim 10, wherein the integrated circuit is disposed on a printed circuit board, and wherein the external temperature is a temperature of the printed circuit board.

13. The electronic system of claim 12, wherein the integrated circuit comprises a first integrated circuit, the second temperature sensor comprises a first external temperature sensor, the external temperature sensed by the second temperature sensor comprises a first external temperature, the temperature signal generated by the first external temperature sensor comprises a first external temperature signal, and wherein the electronic system further comprises a second integrated circuit disposed on the printed circuit board, and the input circuit is further configured to receive a second external temperature signal from a second external temperature sensor that senses a second external temperature of the second integrated circuit.

14. A method of measuring a plurality of temperatures, the method comprising:
 generating a first voltage across a voltage-generation circuit of a first integrated circuit of an electronic system during a first time interval, the first voltage indicative of a first sensed temperature of the first integrated circuit sensed by a first temperature sensor disposed on the first integrated circuit;

receiving, with an input circuit of the first integrated circuit, a temperature signal indicative of a second sensed temperature of a second integrated circuit of the electronic system sensed by a second temperature sensor;

amplifying, with a buffer amplifier of the input circuit, the temperature signal indicative of the second sensed temperature;

generating a second voltage across the voltage-generation circuit based on the temperature signal during a second time interval; and identifying, with a controller of the first integrated circuit, each of the first sensed temperature and the second sensed temperature;

wherein the voltage-generation circuit is electrically connected to the first temperature sensor and to the input circuit without a switching element therebetween.

15. The method of claim 14, further comprising:

outputting, with the controller of the first integrated circuit, one or more control signals to activate the first temperature sensor and deactivate the input circuit during the first time interval; and outputting, with the controller, the one or more control signals to deactivate the first temperature sensor and activate the input circuit during the second time interval.

16. The method of claim 15, further comprising:

outputting, with the controller, the one or more control signals to control a multiplexer of the first integrated circuit to provide a third temperature signal to the input circuit during a third time interval, the third temperature signal indicative of a third sensed temperature.

17. The method of claim 15, further comprising:

activating an amplifier of the second temperature sensor to activate the second temperature sensor during the second time interval; and deactivating the amplifier of the second temperature sensor to deactivate the second temperature sensor during the first time interval.

18. The method of claim 14, further comprising:

sampling, with sample and hold circuitry, the first voltage during the first time interval; and sampling, with the sample and hold circuitry, the second voltage during the second time interval.

19. Temperature detection circuitry comprising:

a voltage-generation circuit disposed on an integrated circuit;

a means, disposed on the integrated circuit, for generating a first voltage across the voltage-generation circuit during a first time interval, the first voltage indicative of a first sensed temperature sensed by a first temperature sensing circuit, the first temperature sensing circuit disposed on the integrated circuit, and the means for generating the first voltage being electrically connected to the voltage-generation circuit without a switching element therebetween; and means for generating a second voltage across the voltage-generation circuit during a second time interval, the second voltage indicative of a second sensed temperature sensed by a second temperature sensing circuit, the second temperature sensing circuit disposed off-chip with respect to the integrated circuit, and the means for generating the second voltage being electrically connected to the voltage-generation circuit without a switching element therebetween;

wherein the means for generating the second voltage comprises a buffer amplifier.

* * * * *